(12) United States Patent
Chakraborty et al.

(10) Patent No.: US 8,954,374 B2
(45) Date of Patent: Feb. 10, 2015

(54) COMMUNITY-DRIVEN MAP CREATION AND ACCESS

(75) Inventors: Dipanjan Chakraborty, Kolkata (IN);
Himanshu Chauhan, New Delhi (IN);
Arun Kumar, Noida (IN)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/710,895

(22) Filed: Feb. 23, 2010

(65) Prior Publication Data

US 2011/0208689 A1 Aug. 25, 2011

(51) Int. Cl.
*G06F 17/00* (2006.01)
*G06N 5/02* (2006.01)

(52) U.S. Cl.
CPC .................... *G06N 5/022* (2013.01)
USPC .......................................................... 706/62

(58) Field of Classification Search
CPC ................................................ G06F 17/30061
USPC .......................................................... 706/62
See application file for complete search history.

(56) References Cited

U.S. PATENT DOCUMENTS

| | | | |
|---|---|---|---|
| 5,177,685 A | 1/1993 | Davis et al. | |
| 5,956,684 A | 9/1999 | Ishii et al. | |
| 6,594,576 B2 * | 7/2003 | Fan et al. | ............ 701/117 |
| 6,871,139 B2 | 3/2005 | Liu et al. | |
| 7,389,207 B2 | 6/2008 | Saitta | |
| 7,539,576 B2 | 5/2009 | Ohnishi et al. | |
| 2007/0219712 A1 | 9/2007 | Abhyanker | |
| 2008/0109439 A1 | 5/2008 | Wu et al. | |
| 2008/0262717 A1 | 10/2008 | Ettinger | |
| 2008/0294678 A1 | 11/2008 | Gorman et al. | |
| 2009/0157311 A1 | 6/2009 | Seltzer et al. | |
| 2009/0157312 A1 | 6/2009 | Black et al. | |

FOREIGN PATENT DOCUMENTS

| | | |
|---|---|---|
| EP | 1 318 379 A1 | 6/2003 |
| WO | WO 2009/075912 A1 | 6/2009 |

OTHER PUBLICATIONS

P. Serdyukov et al., "Placing Flickr Photos on a Map", ACM SIGIR '09, Jul. 19-23, 2009, pp. 484-491.*
L. Cao and J. Krumm, "From GPS Traces to a Routable Road Map", ACM GIS '09, Nov. 4-6, 2009, pp. 3-12.*

(Continued)

*Primary Examiner* — Kakali Chaki
*Assistant Examiner* — Vincent Gonzales
(74) *Attorney, Agent, or Firm* — Ryan, Mason & Lewis, LLP

(57) ABSTRACT

Techniques for creating and enabling access to a community-augmented map are provided. The techniques include uploading user-generated content about one or more locations on a map, processing the user-generated content about one or more locations on the map and storing the user-generated content about one or more locations on the map in an intelligent knowledgebase, applying one or more domain concepts from the intelligent knowledgebase to the user-generated content to infer one or more derivatives in connection with one or more locations in the map, and retrieving information of the one or more locations on the map from the intelligent knowledgebase to provide the map information as augmented metadata on the map.

20 Claims, 6 Drawing Sheets

(56) References Cited

OTHER PUBLICATIONS

Haklay, M., "OpenStreetMap: User-Generated Street Maps", Pervasive Computing, IEEE, vol. 7, Is. 4, pp. 12-18, Oct.-Dec. 2008.*

Dale, R. et al., "Using Natural Language Generation in Automatic Route Description", J. Research and Practice of Info. Tech., vol. 37, No. 1, Feb. 2005, pp. 89-105.*

Donner, J. Customer Acquisition Among Small and Informal Businesses in Urban India: Comparing Face-to-Face and Mediated Channels. EJISDC (2007) 32, 3, 1-16.

Plauche et al., "Tamil Market: A Spoken Dialog System for Rural India," in Working Papers in Computer-Human Interfaces (CHI), 2006.

Parikh, "Position Paper: Mobile Phones may be the Right Devices for Supporting Developing World Accessibility, but is the WWW the Right Service Delivery Model?" in International Cross-Disciplinary Workshop on Web Accessibility (W4A), Scotland, May 2006.

Abdelmoty et al., "A critical evaluation of ontology languages for geographic information retrieval on the Internet," Journal of Visual Languages and Computing., pp. 331-358, Aug. 2005.

Kun et al., "An Ontology-Based Approach for Geographic Information Retrieval on the Web," in International Conference on Wireless Communications, Networking and Mobile Computing, Sep. 2007, pp. 5959-5962.

Abdelmoty et al. "Building Place Ontologies for the Semantic Web: Issues and Approaches," in Proceedings of the 4th ACM workshop on Geographical Information Retrieval, Lisbon, Portugal, Nov. 2007.

Abraham "Mobile Phones and Economic Development: Evidence from the Fishing Industry in India," in IEEE/ACM International Conference on Information and Communication Technologies and Development (ICTD), Berkeley, USA, May 2006.

Ramamritham et al., "Innovative ICT Tools for Information Provision in Agricultural Extension," in IEEE/ACM International Conference on Information and Communication Technologies and Development (ICTD), Dec. 2006.

Reddy et al., "eSaguTM: A Data Warehouse Enabled Personalized Agricultural Advisory System," in ACM SIGMOD International Conference on Management of Data (SIGMOD), Beijing, China, Jun. 2007.

Kotkar et al., "An Audio Wiki for Publishing User-Generated Content in the Developing World," in HCI for Community and International Development (Workshop at CHI 2008), Florence, Italy, Apr. 2008.

Wang et al., "An Audio Wiki Supporting Mobile Collaboration," in Proceedings of the ACM Symposium on Applied Computing (SAC), Brazil, Mar. 2008.

Kay et al., "ONCOR: Ontology and Evidence based Context Reasoner," in Proceedings of International Conference on Intelligent User Interfaces (IUI), Honolulu, Hawaii, Jan. 2007.

Look et al., "Towards Intelligent Mapping Applications: A Study of Elements Found in Cognitive Maps," in Proceedings of International Conference on Intelligent User Interfaces (IUI), Honolulu, Hawaii, Jan. 2007.

Medhi et al., "Text-Free User Interfaces for Illiterate and Semi-Literate Users," in IEEE/ACM International Conference on Information and Communication Technologies and Development (ICTD), Berkeley, USA, May 2006.

Sherwani et al., "Sublime: A Speech- and Language-based Information Management Environment," in In Proc. ICASSP, May 2006.

* cited by examiner

FIG. 3

┌─────────────────────────────────────────────────────────────┐
| Find Path | Find a Location | Add Landmark |                |
└─────────────────────────────────────────────────────────────┘

Add a Landmark

Enter the name of the landmark you want to add and provide the Sub-Area of which its part of.

Landmark Name*: [DeerPark]     Is Part of*: [HauzKhas ▼]

Connected To:
- KarnalCinema
- c9VasantKunj
- BadarnMarket
- Shivalik
- Radisson
- JNU
- MahipalpurFlyover
- ISID
- AnchalPlaza
- ParkBalluchiRestaurant
- IIT
- SDA
- VasantValleySchool
- Priya
- GDGoenkaSchool
- RajinderDhaba
- MalviaNagarMarket
- VasantLokMarket
- Masudpur
- BerSarai Is Near to:
- BadarnMarket
- Shivalik
- Radisson
- JNU
- MahipalpurFlyover
- ISID
- AnchalPlaza
- ParkBalluchiRestaurant
- IIT
- SDA
- VasantValleySchool
- Priya
- GDGoenkaSchool
- RajinderDhaba
- MalviaNagarMarket
- VasantLokMarket
- Masudpur
- BerSarai
- GreenParkMarket
- DLTA

[Add Landmark]

| Find Path | Find a Location | Add Landmark | |
|---|---|---|---|

Find path between locations

Please enter your source and destination

Do not worry about which area/city they are in, only enter the location landmark name. We would try to find the connecting path!

From* [GrandHotel]
To* [ParkBalluchiRestaurant]

[Find Path]

Following path was found connecting the given pair

| 1. | Start From: GrandHotel (SectorC-VasantKunj) |
|---|---|
| 2. | Then go to: Priya (Munirka) |
| 3. | Then go to: JNU (Munirka) |
| 4. | Then go to: IIT (HauzKhas) |
| 5. | Then go to: SDA (HauzKhas) |
| 6. | Then go to: GreenParkMarket (GreenPark) |
| 7. | From there reach your destination: ParkBalluchiRestaurant (HauzKhas) |

COMMUNITY-DRIVEN MAP CREATION AND ACCESS

FIELD OF THE INVENTION

Embodiments of the invention generally relate to information technology involving user generated content creation, and, more particularly, to map-based services.

BACKGROUND OF THE INVENTION

Many services taken for granted in the developed world are often missing from the developing countries. One example is that of map systems that form the basis of many location-driven services. Its heavy reliance on content provides a barrier towards building such systems. Further, in developing countries, the infrastructure can typically have a history of unplanned development, leading to unorganized addresses and absence of standard naming conventions for roads. Detailed map systems such as, for example, online maps have only recently started becoming available but for major cities. Remote towns and villages remain out of reach.

SUMMARY OF THE INVENTION

Principles and embodiments of the invention provide techniques for community-driven map creation and access. An exemplary method (which may be computer-implemented) for creating and enabling access to a community-augmented map, according to one aspect of the invention, can include steps of uploading user-generated content about one or more locations on a map, processing the user-generated content about one or more locations on the map and storing the user-generated content about one or more locations on the map in an intelligent knowledgebase, applying one or more domain concepts from the intelligent knowledgebase to the user-generated content to infer one or more derivatives in connection with one or more locations in the map, and retrieving information of the one or more locations on the map from the intelligent knowledgebase to provide the map information as augmented metadata on the map.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating example web user interface (UI) for adding a new landmark, according to an embodiment of the invention;

FIG. 4 is a diagram illustrating example web user interface (UI) showing results of a query for directions, according to an embodiment of the present invention;

DETAILED DESCRIPTION

Figure 1:
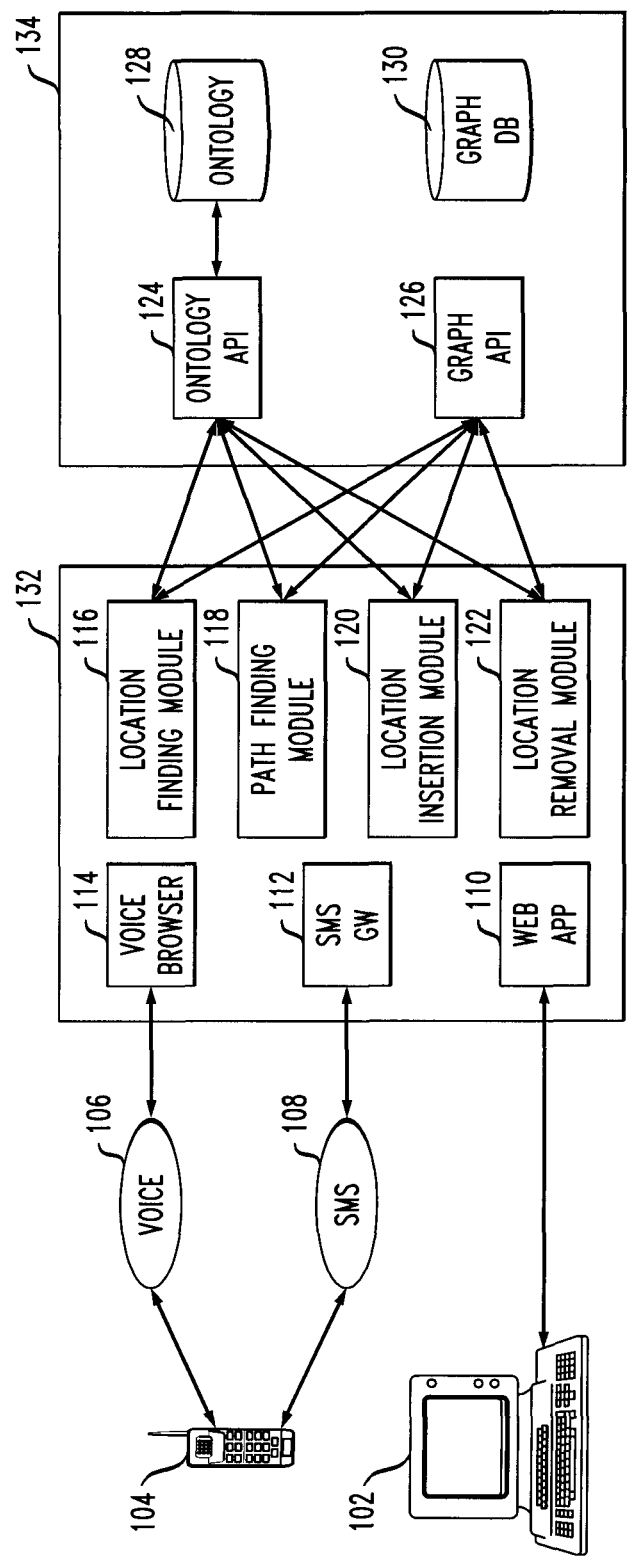
FIG. 1 is a diagram illustrating example system architecture, according to an embodiment of the invention.

Principles of the invention include creating an intelligent community-augmented map. One or more embodiments of the invention include a community-driven approach for creating maps (for example, in developing regions) following Web 2.0 principles, but not entirely relying on the existing Web. The techniques described herein include creating a framework (for example, exploiting ontological reasoning) whereby geographic information can be captured, enriched, and funneled back to users, customized to the needs of users if desired.

For example, while finding directions, a user interface of one or more embodiments of the invention facilitates users to specify the level of detail they are looking for, varying from source to the destination. In contrast to existing approaches, one or more embodiments of the invention include implementing an ontology that is suitable for capturing map information from communities, keeping logical integrity in mind, and by utilizing standardized semantics of web ontology language (OWL).

Also, one or more embodiments of the invention includes harnessing user-generated content about locations and providing map-based services that represent users' intuitive way of finding locations and directions in developing regions. Creating a community augmented map knowledge base can include capturing community input using different modalities (for example, voice, text, etc.), wherein the map incorporates local knowledge of the community about a geographical area (rather than its spatial representation).

Locations in the map can represent community data about the locations, location name, and intuitive logical (non-numeric) relationships that a community draws of a location relative to surrounding locations (for example, A is near B, A is opposite B, A is adjacent to B, etc.). Such a map can also include meta information about the location such as, for example, traversable routes or real-time information about the location. Augmenting the map with spatial knowledge of the area would lead to a knowledgebase that contains the traditional spatial representation as well as the intuitive knowledge of community about that area. Also, paths present additional details based on community knowledge, superimposed on traversable routes between two locations.

The techniques detailed herein include using the notion of a landmark as the basic unit of representing nodes. A location can represent, for example, coarse grained geographical area such as a village, city, country, etc., in addition to also representing a landmark. A core knowledgebase of one or more embodiments of the invention can capture logical characteristics of locations that users are interested in specifying, and making use thereof. Such characteristics can include, by way of example, direction (that is, the positioning of a location relative to another one). Users may be more comfortable, for example, with providing relative information such as "towards left of," "on the right side of," etc. instead of absolute direction in the form of north, east, west, south compass points.

Logical characteristics of locations can additionally include distance (that is, the measure of amount of space between two locations). This can be represented, for example, as numbers along with units in which the distance is expressed. One or more embodiments of the invention includes considering both time and metric units to represent distance. Logical characteristics also include proximity and reachability (that is, representation of information stating that one location is in close proximity to another or is reachable from another respectively), as well as layer (that is, granularity of geographic area that a location name represents). A layer can be, for example, a division as big as a whole country or as small as a village.

The notion of direction and distance from a location can be interpreted with respect to the layer that the location represents. In other words, direction and distance can be viewed as binary operator over locations of the same level. For example, "is towards left of" would be appropriate if the location pair being considered is <Libya, Egypt> or <South Korea, Japan> but not if the pair is <Waikiki hotel, Mexico> where Waikiki hotel is in Honolulu, Hi.

The techniques described herein additionally include modeling knowledgebase for representing and storing these ontological concepts. Ontological concepts can include terms defined in the ontology that capture domain knowledge as simple facts established in the community. By way of example, the notation of "Location" can be referred to as a concept herein. One or more embodiments of the invention include making use of web ontology language (OWL) to model the categorical characteristics of a landmark (that is, direction, proximity, reachability and layer). Use of a semantic web language to represent relationships between locations enables a capability to reason on those and infer newer relationships not explicitly specified by users of the system. One or more embodiments of the invention include making use of a graph database to represent distance between landmarks which is numerical data. The modules are used in conjunction to generate answers to queries submitted by users to the system.

A knowledgebase can include a graph database and an ontology of locations. In one or more embodiments of the invention, the graph database can include a graph data structure based representation of the locations. The locations can be represented by nodes and the edges between two nodes of the graph can be labeled with the distance between the corresponding locations.

As described herein, one or more embodiments of the invention include creating basic map objects from community input regarding locations, location name, etc. Further, intuitive and logical (non-numeric) relationships that a community draws of this location relative to surrounding locations can also be contributed. The community input, captured as basic map objects in the created map, incorporates local knowledge of the community that maintains logical integrity. Additionally, one or more embodiments of the invention can include intelligently inferring new relationships from the provided inputs to fill missing data, and using semantic reasoning on the complete map including directly contributed map objects as well as inferred data to get information such as traversable routes. Meta information about map objects can also be contributed to and obtained from the knowledgebase, and one or more embodiments of the invention can also include support for different modalities such as, for example, voice interaction over telephony, text based mechanisms such as short message service (SMS) and/or web.

As noted herein, one or more embodiments of the invention include obtaining spatial integrity in a logical sense without considering spatial integrity in the physical sense. For example, information such as "Building A is located near circle J after taking first turn on the circle while arriving from location B" can be treated as complete and correct for tracing path from B to A.

In one or more embodiments of the invention, a visual representation is not essential, a useful consideration given the fact that many users in developing countries do not have access to the Internet. The techniques detailed herein are non-static and intelligent, and can infer new information from what is entered by the users.

Additionally, one or more embodiments of the invention can include adopting the Wiki model and allow users to add, edit and remove content freely.

Further, one or more embodiments of the invention can be used to store non-structured (for example, voice) map-related inputs, and the relationships can be used to compute reachability from one location to another. The techniques described herein can also include providing support for a voice interface (for example, over a telephone call).

By way of example and not limitation, the user set in one or more embodiments of the invention can include people who might be illiterate or semi-literate or not very information technology (IT) savvy. As such, one or more embodiments of the invention can include different modes of interaction to cater to different user segments for different tasks. Tasks that a user can perform can include, for example, the following. One can find a landmark and/or location by specifying its name and, in one or more embodiments of the invention, including some related information such as nearby places or enclosing area. Also, users can ask for a tracing of a path between two locations. Users can also add to the knowledgebase by adding information about a location and/or landmark. Further, in one or more embodiments of the invention, some or all users can also be given the facility to edit or remove entries from the knowledgebase.

Users can access a system such as detailed herein, by way of example, over the Web. One or more embodiments of the invention include providing a web interface to users for submitting queries as well as for updating its knowledgebase by adding new locations and related information. Also, one or more embodiments of the invention support a voice-based interface for querying the system. Additionally, one or more embodiments of the invention facilitate short message service (SMS) based querying and location updates in a constrained form for users.

FIG. 1 is a diagram illustrating example system architecture, according to an embodiment of the invention. As illustrated in FIG. 1, users can upload content into the knowledgebase (for example, via a phone 104 or computer 102) through an SMS interface 108, a web based interface or through a voice interface 106. Similarly, the content delivery to the consumers can also occur through these multiple interfaces. The knowledgebase 134 includes an ontology 128 and a graph database 130 (which interact with an ontology application programming interface (API) 124 and a graph API 126, respectively). An ontology is used as the primary repository of the location information. This is because the user generated content cannot be expected to be complete. One or more embodiments of the invention include the ability to infer facts not explicitly populated by users in order to have a pragmatic map system. The graph portion of the database captures additional information that, for example, cannot be expressed appropriately in the ontology or needs to be processed differently. This can include, by way of example, numeric data such as distances between locations.

The central block 132 of FIG. 1 forms the core of the runtime system of one or more embodiments of the invention, acting as an intermediary between the consumers of the service (via a voice browser component 114, an SMS gateway component 112 and a web application component 110) and the knowledgebase. It includes modules corresponding to tasks detailed herein, namely, a location insertion module 120, a location removal module 122, a location finding module 116 and a path finding module 118. Block 132 can also provide a similar interface to the users across interaction modalities for information upload and retrieval.

As described herein, one or more embodiments of the invention include a knowledgebase that includes a graph database and an ontology of locations. The graph database can include a graph data structure based representation of the locations. The locations can be represented by nodes and the edges between two nodes of the graph can be labeled with the distance between the corresponding locations. In one or more embodiments of the invention, given the insights gained from user surveys, precise distances (and exact directions) are not essential components of a map for certain users. Additionally, the techniques detailed herein can include an ontology of locations that helps construct paths and retrieve information that no user may have explicitly entered.

Figure 2:
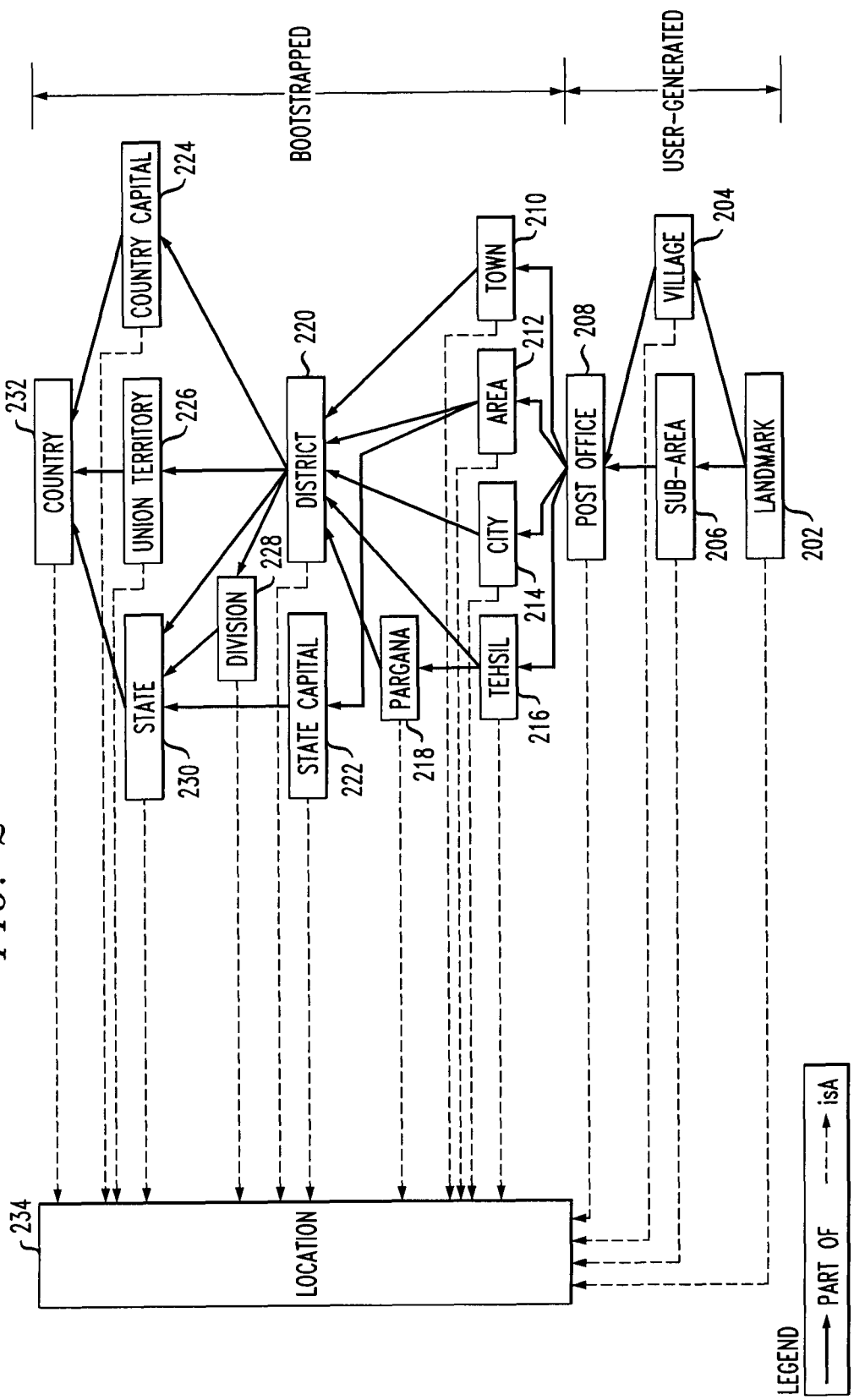
FIG. 2 is a diagram illustrating ontology design, according to an embodiment of the present invention.

FIG. 2 is a diagram illustrating ontology design, according to an embodiment of the present invention. By way of illustration, FIG. 2 depicts concepts in the location ontology derived from concept Location 234. The highest level concept that the ontology currently represents is Country 232. The rest of the concepts are examples and defined specific to India keeping in view the administrative structure of the country. By way of example, FIG. 2 also includes concepts such as Division 228, State 230, Union Territory 226, Country Capital 224, State Capital 222, District 220, Pargana 218, Tehsil 216, City 214, Area 212, Town 210, Post Office 208, SubArea 206, Village 204 and Landmark 202.

One or more embodiments of the invention can additionally include a concept labeled Space, which is defined as complementary and disjoint to Location. Such a concept can be used, for example, with OWL ontologies that follow the open world assumption, meaning that a relation not explicitly asserted in the ontology being reasoned upon cannot be concluded to be false since it may be specified elsewhere.

Each location can be related to other locations to logically represent the geographical relationship that exists between them in the world. As can be observed from FIG. 2, apart from is A relation of all locations with the Location concept, each location concept is related to one or few location concepts through a partOf relation. This relation helps establish the layering between various geographic locations.

Landmarks lie at the lowest strata of the ontology. By way of example, because the administrative structure of a country remains relatively static and is generally well known, the top part of the ontology can be bootstrapped in advance and users can be allowed to contribute instances from the lower half including landmarks and sub-areas. Also, some key landmarks such as historic sites of national importance and key government offices could also be pre-populated into the ontology.

The ontology supports several relationships in order to be able to specify characteristics of a location, as described herein. For example, such relationships can include nearTo and connectedTo, relationships that model the proximity and reachability characteristic, respectively.

Relation nearTo is a symmetric relation defined between two locations to express the fact that they are in close proximity to each other. This could, for example, intuitively mean a few hundred meters or a kilometer. The logical integrity of nearness can be applicable to locations other than landmarks. By way of example, two towns in the same district can be considered nearTo each other, compared to two towns in different districts. To capture these, for SubAreas a sameTown relation and for Areas a sameDistrict relation and so on can be defined. As detailed herein, the modules of one or more embodiments of the invention make use of the nearTo relation to search for or add/update locations specified in a user's query.

The connectedTo relation is a symmetric as well as a transitive relation. It expresses the fact that two locations are reachable from each other via one or more paths that can obtained from the ontology facts. Users may add a connectedTo relation between location instances with which they are familiar. One or more embodiments of the invention make use of the ontology to infer new connectedTo relations based upon these individual assertions. For example, the path finder module, as described herein, relies on this information to compute paths from the individual connections supplied by users.

One or more embodiments of the invention can additionally include bootstrapping from existing databases to populate instances of location types in the upper part of the ontology. Two such sources of data in the absence of a full-fledged Geographical Information System (GIS) system can, for example, come from the telecom industry and the Postal Department. For example, given that mobile phones have penetrated into most areas (including remote rural areas), the upper ontology can be populated from their data as well. While the actual GIS data benchmarking require significant efforts and cost on the field to map the spatial data, the telecom and post office data can provide a very good logical view of the locations.

One or more embodiments of the invention can additionally include a knowledgebase application programming interface (API) for accessing the knowledgebase for finding path, location or for adding a landmark. A findLocation( ) technique allows a user to search for a location specified by its name. Also, in one or more embodiments of the invention, extra information can be supplied that includes the landmark's relationship with another landmark or its attributes. A findPath( ) technique takes source location name and destination location name along with a filtering criteria and returns a list of locations that represent the path traversal from source to destination. In one or more embodiments of the invention, the location names can be augmented with a list of nodes that represent meta information about the position of the source or destination node in the ontology. The filtering criteria can specify additional restrictions (for example, only traverse paths connected by a nearTo relation) on the path traversal algorithm.

A doesExist( ) technique determines whether the supplied landmark name already exists in the knowledgebase. Additionally, an addLandmark( ) technique allows the user to insert a new landmark into the knowledgebase. Such a technique can take the name of the new landmark and also its immediate parent, that is, its SubArea name. In one or more embodiments of the invention, its next parent can also be supplied. If this landmark already exists, this new entry is rejected. Also, this landmark is added only within the context of its parent, that is, its SubArea. If the SubArea supplied does not exist, then the landmark is rejected. In addition to the landmark name, the user can also specify other meta information such as, for example, which landmarks are located nearby and to which landmarks this new one is connected. Further, an editLandmark( ) technique allows a user to search for a landmark or a relation instance and allows a user to delete it in the fashion similar to addLandmark( ).

As detailed herein, one or more embodiments of the invention can, for example, implement a Web-based interface as well as a voice-based interface. A Web-based interface can support all implemented modules and can be developed, by way of example, using Java Server Pages (JSP). The voice-based interface is accessible over a phone call and can support, for example, find location and find path modules. Also, such an interface can be developed using JSPs and VoiceXML (extensible markup language).

In one or more embodiments of the invention, users are allowed to populate the system with new landmarks and associate them to the SubArea to which they belong. Additionally, users can also provide information about the landmark. This can include other landmarks located near to the one being added, and other landmarks that are connected to this by road, etc. FIG. 3 is a diagram illustrating a screen shot 302 of an example web user interface (UI) for adding a new landmark, according to an embodiment of the invention. Also, in one or more embodiments of the invention, users are also allowed to query the system for getting location information and directions. FIG. 4 is a diagram illustrating a screen shot 402 of an example web user interface (UI) showing results of a query for directions from a source to a destination location, according to an embodiment of the present invention.

Figure 5:
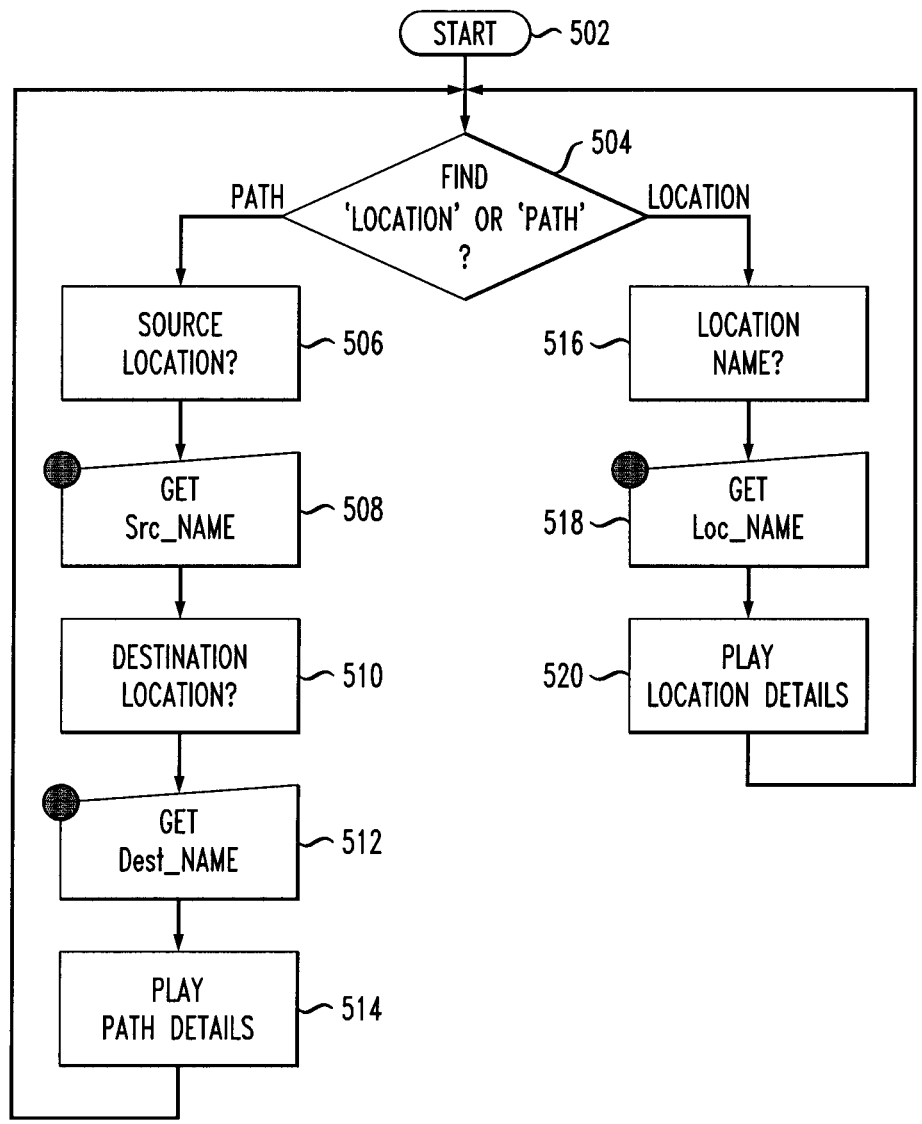
FIG. 5 is a flow diagram illustrating querying a system through a voice-based interface, according to an embodiment of the present invention.

FIG. 5 is a flow diagram illustrating querying a system through a voice-based interface, according to an embodiment of the present invention. Step 502 includes starting the process. Step 504 includes finding a location or path. If a path is found, one proceeds to step 506 to determine a source location. Step 508 includes obtaining a Src_Name (source name). Additionally, step 510 includes determining a destination location, while step 512 includes obtaining a Dest_Name (destination name). Step 514 includes playing the path details. If a location is found in step 504, one proceeds to step 516 to determine a location name, while step 518 includes obtaining a Loc_Name (location name). Step 520 includes playing the location details. As also depicted in FIG. 5, the dots (as seen in connection with step 508, step 512 and step 518) indicate voice recognition steps.

Figure 6:
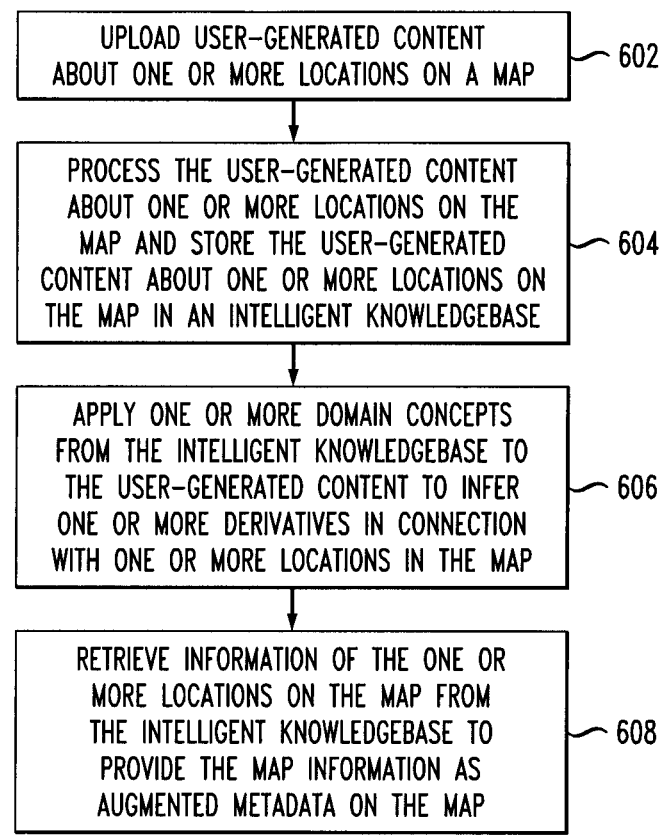
FIG. 6 is a flow diagram illustrating techniques for creating and enabling access to a community-augmented map, according to an embodiment of the invention.

FIG. 6 is a flow diagram illustrating techniques for creating and enabling access to a community-augmented map, according to an embodiment of the present invention. Step 602 includes uploading user-generated content about one or more locations on a map. Uploading user-generated content can include uploading new location information, wherein uploading new location information results in creation of a location in the map representation in the knowledgebase. Also, uploading new location information can include uploading new location information from a user and/or one or more existing databases.

Step 604 includes processing the user-generated content about one or more locations on the map and storing the user-generated content about one or more locations on the map in an intelligent knowledgebase. Processing and storing the user-generated content can include using an intelligent knowledgebase. An intelligent knowledgebase can, for example, parse the user-generated content to determine one or more relevant location details that can be loaded in an internal store of the knowledgebase, organize the location details and adding them into the knowledgebase, use the newly added location details and one or more defined reasoning primitives (such as, but not limited to, subsumption, symmetricity, property restrictions, etc.) to infer one or more facts related to geographical data of the one or more locations on the map, and bootstrap the intelligent knowledgebase with map information from one or more third-party sources and one or more defining reasoning primitives to infer additional geographical data.

Processing and storing the user-generated content about one or more locations on the map can also include placing a location on the map (for example, a hierarchy of locations) based upon location data and corresponding location information, and determining names of one or more additional locations that are logically related with the one or more locations (such as, for example, other locations that are near to, adjacent to, opposite to the locations).

Step 606 includes applying one or more domain concepts from the intelligent knowledgebase to the user-generated content to infer one or more derivatives in connection with one or more locations in the map. Step 608 includes retrieving information of the one or more locations on the map from the intelligent knowledgebase to provide the map information as augmented metadata on the map. Providing the map information as augmented metadata on the map can include, for example, providing the map information as augmented metadata on the map for one or more location details and/or routing directions.

Retrieving information of the one or more locations on the map can include determining a name of the location and meta information in connection with the location (such as, for example, immediate containing location and/or other related locations from an user), as well as searching and fetching one or more remaining details (user data or inferred data) about this location.

Further, retrieving information of the one or more locations on the map can include retrieving information about how two or more locations are reachable from each other. Retrieving information about how two or more locations are reachable from each other can include computing a path (that exists in the knowledgebase) between the two or more locations, wherein each node in the path are linked using at least one of user-supplied data, inferred data, domain data and bootstrap data, as well as retrieving information of each node in the path and augmenting it with the path information.

The techniques depicted in FIG. 6 can additionally include updating information related to a location, as well as facilitating one or more input modalities and one or more output modalities. Input modalities and output modalities can include, for example, phone, short message service (SMS), web, etc.

The techniques depicted in FIG. 6 can also, as described herein, include providing a system, wherein the system includes distinct software modules, each of the distinct software modules being embodied on a tangible computer-readable recordable storage medium. The distinct software modules can include, for example, a knowledgebase module, a location finding module, a path finder module, a location insertion module, a location removal module, an ontology module, a graph database module, an input module and an output module executing on a hardware processor.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
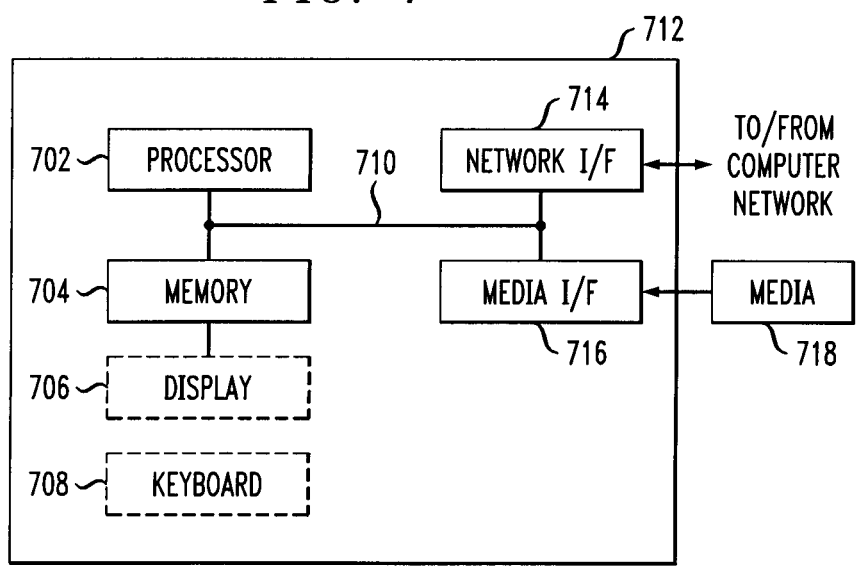
FIG. 7 is a system diagram of example computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, capturing community input using different modalities to generate a map that incorporates local knowledge of the community about a geographical area.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for creating and enabling access to a community-augmented map, wherein the method comprises:

uploading user-generated content, wherein said user-generated content comprises content pertaining to one or more locations on a map and content pertaining to a relationship between the one or more locations and one or more additional locations on a map, and wherein said user-generated content comprises multiple modalities;

processing the user-generated content and storing the user-generated content in an intelligent knowledgebase;

applying one or more existing items of user-generated content from the intelligent knowledgebase to the uploaded user-generated content to infer one or more characteristics of one or more locations on the map based on the content pertaining to the relationship between the one or more locations in the uploaded user-generated content and the one or more additional locations on a map, wherein said one or more inferred characteristics are inferred from one or more human-originated non-numeric relationships, derived via one or more human community members, of the one or more locations relative to one or more surrounding locations;

retrieving the one or more inferred characteristics of the one or more locations on the map from the intelligent knowledgebase;

augmenting metadata on the map based on the one or more inferred characteristics, wherein said augmenting comprises (i) providing real-time information about one or more locations on the map, (ii) identifying one or more traversable routes between two or more locations on the map, and (iii) super-imposing user-generated content pertaining to one or more locations on the one or more traversable routes; and outputting one of the one or more traversable routes in response to a query comprising a source location name and a destination location name, wherein said output traversable route comprises (i) a sequential list of multiple location names that represents a path traversal from the source location to the destination location and (ii) at least one inferred characteristic, from the one or more inferred characteristics, associated with each of the multiple location names in the sequential list.

2. The method of claim 1, further comprising:
providing the map information as augmented metadata on the map for one or more location details.

3. The method of claim 1, further comprising:
providing the map information as augmented metadata on the map for routing directions.

4. The method of claim 1, wherein uploading user-generated content comprises uploading new location information, wherein uploading new location information results in creation of a location in the map representation in the knowledgebase.

5. The method of claim 4, wherein uploading new location information comprises uploading new location information from at least one of a user and one or more existing databases.

6. The method of claim 1, wherein retrieving information of the one or more locations on the map comprises determining a name of the location and meta information in connection with the location.

7. The method of claim 1, wherein retrieving information of the one or more locations on the map comprises retrieving information about how two or more locations are reachable from each other.

8. The method of claim 7, wherein retrieving information about how two or more locations are reachable from each other comprises:

computing a path between the two or more locations, wherein each node in the path are linked using at least one of user-supplied data, inferred data, domain data and bootstrap data; and retrieving information of each node in the path and augmenting it with the path information.

9. The method of claim 1, further comprising updating information related to a location.

10. The method of claim 1, further comprising facilitating one or more input modalities and one or more output modalities.

11. The method of claim 10, wherein the one or more input modalities and one or more output modalities comprise at least one of phone, short message service (SMS) and web.

12. The method of claim 1, wherein an intelligent knowledgebase:

bootstraps the intelligent knowledgebase with map information from one or more third-party sources and one or more defining reasoning primitives to infer additional geographical data;

parses the user-generated content to determine one or more relevant location details that can be loaded in an internal store of the knowledgebase;

organizes the one or more location details and adding them into the knowledgebase; and uses the one or more newly added location details and one or more defined reasoning primitives to infer one or more facts related to geographical data of the one or more locations on the map.

13. The method of claim 1, wherein processing and storing the user-generated content comprises:

placing a location on the map based upon location data and corresponding location information; and determining names of one or more additional locations that are logically related with the one or more locations.

14. The method of claim 1, further comprising providing a system, wherein the system comprises one or more distinct software modules, each of the one or more distinct software modules being embodied on a tangible computer-readable recordable storage medium, and wherein the one or more distinct software modules comprise a knowledgebase module, a location finding module, a path finder module, a location insertion module, a location removal module, an ontology module, a graph database module, an input module and an output module executing on a hardware processor.

15. A computer program product comprising a tangible computer readable recordable storage medium including computer useable program code for creating and enabling access to a community-augmented map, the computer program product including:

computer useable program code for uploading user-generated content, wherein said user-generated content comprises content pertaining to one or more locations on a map and content pertaining to a relationship between the one or more locations and one or more additional locations on a map, and wherein said user-generated content comprises multiple modalities;

computer useable program code for processing the user-generated content and storing the user-generated content in an intelligent knowledgebase;

computer useable program code for applying one or more existing items of user-generated content from the intelligent knowledgebase to the uploaded user-generated content to infer one or more characteristics of one or more locations on the map based on the content pertaining to the relationship between the one or more locations in the uploaded user-generated content and the one or more additional locations on a map, wherein said one or more inferred characteristics are inferred from one or more human-originated non-numeric relationships, derived via one or more human community members, of the one or more locations relative to one or more surrounding locations;

computer useable program code for retrieving the one or more inferred characteristics of the one or more locations on the map from the intelligent knowledgebase;

computer useable program code for augmenting metadata on the map based on the one or more inferred characteristics, wherein said augmenting comprises (i) providing real-time information about one or more locations on the map, (ii) identifying one or more traversable routes between two or more locations on the map, and (iii) super-imposing user-generated content pertaining to one or more locations on the one or more traversable routes; and computer useable program code for outputting one of the one or more traversable routes in response to a query comprising a source location name and a destination location name, wherein said output traversable route comprises (i) a sequential list of multiple location names that represents a path traversal from the source location to the destination location and (ii) at least one inferred characteristic, from the one or more inferred characteristics, associated with each of the multiple location names in the sequential list.

16. The computer program product of claim 15, wherein the computer useable program code for providing the map information as augmented metadata on the map comprises computer useable program code for providing the map information as augmented metadata on the map for one or more location details and for routing directions.

17. The computer program product of claim 15, further comprising computer useable program code for updating information related to a location.

18. A system for creating and enabling access to a community-augmented map, comprising:
a memory; and
at least one processor coupled to the memory and operative to:
upload user-generated content, wherein said user-generated content comprises content pertaining to one or more locations on a map and content pertaining to a relationship between the one or more locations and one or more additional locations on a map, and wherein said user-generated content comprises multiple modalities;

process the user-generated content and storing the user-generated content in an intelligent knowledgebase;

apply one or more existing items of user-generated content from the intelligent knowledgebase to the uploaded user-generated content to infer one or more characteristics of one or more locations on the map based on the content pertaining to the relationship between the one or more locations in the uploaded user-generated content and the one or more additional locations on a map, wherein said one or more inferred characteristics are inferred from one or more human-originated non-numeric relationships, derived via one or more human community members, of the one or more locations relative to one or more surrounding locations;

retrieve the one or more inferred characteristics of the one or more locations on the map from the intelligent knowledgebase;

augment metadata on the map based on the one or more inferred characteristics, wherein said augmenting comprises (i) providing real-time information about one or more locations on the map, (ii) identifying one or more traversable routes between two or more locations on the map, and (iii) super-imposing user-generated content pertaining to one or more locations on the one or more traversable routes; and output one of the one or more traversable routes in response to a query comprising a source location name and a destination location name, wherein said output traversable route comprises (i) a sequential list of multiple location names that represents a path traversal from the source location to the destination location and (ii) at least one inferred characteristic, from the one or more inferred characteristics, associated with each of the multiple location names in the sequential list.

19. The system of claim 18, wherein the at least one processor coupled to the memory operative to provide the map information as augmented metadata on the map is further operative to provide the map information as augmented metadata on the map for one or more location details and for routing directions.

20. The system of claim 18, wherein the at least one processor coupled to the memory is further operative to update information related to a location.

* * * * *